Dec. 11, 1962   E. P. AGHNIDES   3,067,952
WATER AERATORS WITH CORRUGATED FAUCET CONNECTOR
Filed Aug. 18, 1960
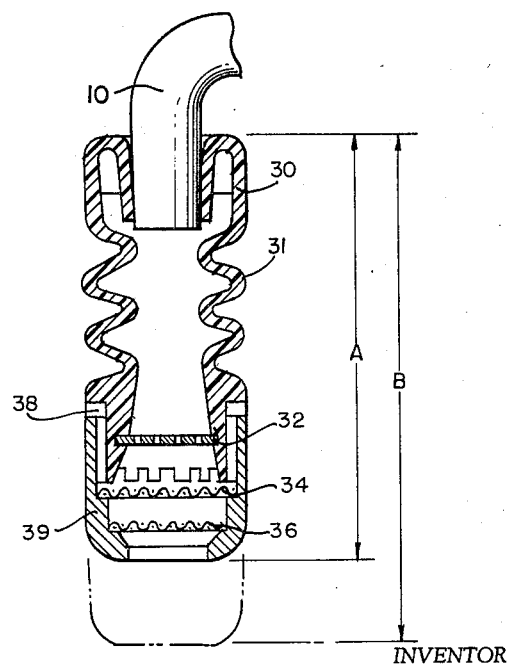
INVENTOR
Elie P. Aghnides
BY *Moore & Hall*
ATTORNEYS

United States Patent Office 3,067,952
Patented Dec. 11, 1962

3,067,952
WATER AERATORS WITH CORRUGATED
FAUCET CONNECTOR
Elie P. Aghnides, 46 W. 54th St., New York 19, N.Y.
Filed Aug. 18, 1960, Ser. No. 50,413
2 Claims. (Cl. 239—431)

This invention relates to water aerators and more particularly to aerators of the general type shown in my prior U.S. Patents No. 2,210,846, granted August 6, 1940, and No. 2,316,832, granted April 20, 1943. The aerators of the aforesaid prior patents comprise a diaphragm having one or more small orifices to deliver streamlets of water having substantial velocity and one or more wire mesh screens downstream said diaphragm, air being admitted through an orifice leading to a space between the diaphragm and the screen. The size of the opening or openings in the diaphragm is so related to the resistance of the screens that a large number of bubbles are entrained in the screen and a white coherent jet of aerated water emerges from the outlet of the aerator.

Aerators of the prior art usually project their aerated output in a stream of constant direction. It is an object of this invention to provide an aerator in which the stream may be moved and/or rotated in order that the user of the aerator may direct the bubbly stream anywhere in the sink and, if desired, move a part of the aerator so that the stream washes the surface of the entire sink.

As shown by my aforesaid prior patents, faucet aerators may have a rubber coupling for attaching the aerator to the faucet. One disadvantage of this arrangement is that if the water faucet is turned on abruptly the impact of the water on aerator diaphragm may have sufficient force to drive the aerator off of the faucet. An object of this invention is to avoid this disadvantage.

Other objects and advantages of the invention will appear as this description proceeds.

In carrying out the aforesaid objects, I provide an accordion-like elongated rubber coupling for attaching the aerator to the faucet. This enables the free end of the aerator to be moved or rotated to direct the water to any part of the sink, and it also reduces the force resulting from the initial momentum of the water upon the aerator diaphragm and thus reduces the force tending to force the aerator off of the faucet.

This invention is an improvement upon the device of my prior copending application Serial No. 673,017, filed July 19, 1957 for "Water Aerators," now abandoned.

The drawing is a cross-sectional view of the aerator embodying the invention.

In the drawing the rubber casing 30 is adapted to be inserted onto faucet 10 and has an accordion-like corrugated section 31 supporting the upstream perforated diaphragm 32. This diaphragm projects jets downstream upon screen 34 and thereafter to screen 36, which screens finely break up the water and mix the same with air to form a coherent jet containing numerous small bubbles. The screens are carried by casing element 39 which is supported by the casing 31 with an intervening air entrance 38.

The above arrangement is an improvement over ordinary rubber aerators in that it is not easily forced off of the faucet when the water is turned on, since the accordion-like corrugated section 31 will expand under pressure of the water and allow the aerator to enlarge from length A to length B as the water pressure is built up inside the device. This serves to reduce the force resulting from the initial momentum of the water upon the diaphragm 32 and thus reduces the force tending to force the device off the faucet.

Moreover, the device can be turned or twisted in practically any direction, enabling water to be directed to practically any part of the sink.

Screen 34 is held in place by a friction fit, the periphery of the screen tightly engaging the inner wall of plastic member 39.

The lower screen 36 rests freely upon a ledge in member 39 and this screen can freely move up and down between the position shown and one immediately adjacent screen 34; however, during operation of the device the force of the water holds screen 36 in the position shown. The feature described in this paragraph has the advantage that it renders it unnecessary to use a spacer ring to separate the two screens.

I claim to have invented:

1. An aerator having an elastic casing adapted to be attached at its upstream end to a faucet, means carried within and near the downstream end of the casing for increasing the velocity of the water, said elastic casing having corrugations which expand in a downstream direction in response to the impact of the water on said means to thereby absorb the shock of the water striking said means, and mixing means carried by the downstream end of the casing for finely breaking up the water and mixing it with air to produce a coherent jet laden with small bubbles, the downstream side of the first means being exposed to air.

2. An aerator having an elastic casing adapted at its upstream end to be slipped over the end of and grip a faucet, jet forming means carried by the downstream end of said casing for increasing the velocity while decreasing the cross-section of the water to thus produce at least one high velocity jet in a downstream direction, said elastic casing having a plurality of accordion-like corrugations so that it can be readily expanded when the pressure of the water from the faucet initially strikes said means to thus absorb the impact and reduce the force tending to force the aerator off of the faucet, said casing also being elongated to render the same more effective in absorbing said impact and also to permit the casing to be flexed manually through at least ninety degrees to direct the output stream in different directions through 360 degrees, air-inlet means through said casing wall to conduct ambient air into said casing below said jet forming means and mixing means spaced downstream the jet forming means below said air-inlet means and carried by the downstream end of the elastic casing for finely breaking up the water from the jet forming means and mixing such water with air to produce a coherent jet of water laden with numerous small bubbles.

References Cited in the file of this patent

UNITED STATES PATENTS

| | | |
|---|---|---|
| 1,324,850 | Roberts | Dec. 16, 1919 |
| 2,210,846 | Aghnides | Aug. 8, 1940 |
| 2,244,280 | Aghnides | June 3, 1941 |
| 2,747,930 | Hyde | May 29, 1956 |
| 2,928,607 | Shames et al. | Mar. 15, 1960 |

FOREIGN PATENTS

| | | |
|---|---|---|
| 19,147 | Great Britain | Sept. 8, 1898 |
| 521,613 | Italy | Mar. 30, 1955 |
| 734,408 | France | Aug. 1, 1932 |